United States Patent
Tu

(10) Patent No.: US 7,590,488 B2
(45) Date of Patent: Sep. 15, 2009

(54) ROUTE CONDITION EVALUATION METHOD AND APPARATUS FOR NAVIGATION SYSTEM

(75) Inventor: Ihung Tu, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 393 days.

(21) Appl. No.: 11/502,014

(22) Filed: Aug. 10, 2006

(65) Prior Publication Data

US 2008/0040031 A1    Feb. 14, 2008

(51) Int. Cl.
    *G01C 21/30*    (2006.01)
(52) U.S. Cl. .................. 701/209; 701/210; 340/995.13
(58) Field of Classification Search ......... 701/207–213; 340/995.13
    See application file for complete search history.

(56) References Cited

U.S. PATENT DOCUMENTS 7,366,606 B2 * 4/2008 Uyeki ........................ 701/117
7,376,509 B2 * 5/2008 Endo et al. .................. 701/209
7,395,151 B2 * 7/2008 O'Neill et al. .............. 701/209

FOREIGN PATENT DOCUMENTS

| JP | 8-313285 | 11/1996 |
|----|----------|---------|
| JP | 10-38597 | 2/1998  |

* cited by examiner

*Primary Examiner*—Richard M. Camby
(74) *Attorney, Agent, or Firm*—Muramatsu & Associates

(57) ABSTRACT

A method and apparatus for a navigation system evaluates an overall cost of each candidate route by incorporating traffic information such as traffic incident types and traffic flow speeds. An optimum route to the destination is determined by comparing the costs of two or more candidate routes and selecting a candidate route of the least cost. The method and apparatus determines relevancy and accuracy of the traffic information and adjusting the cost of the candidate route. When the traffic information on the candidate route shows a conflicting situation, the method and apparatus modifies the cost derived from the traffic information. When modifying the cost, the traffic speed information is prioritized over other type of traffic information.

16 Claims, 10 Drawing Sheets

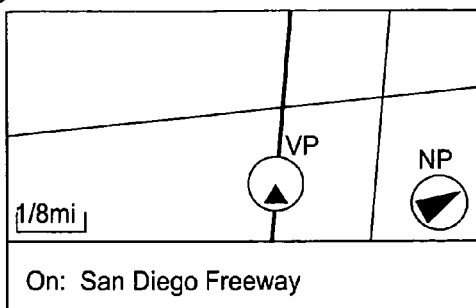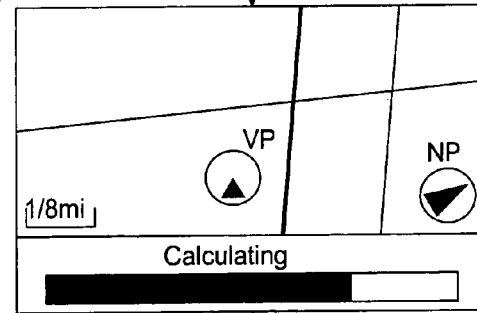

Fig. 10

| No Traffic Information | Traditional Cost Evaluation |
|---|---|
| Traffic Incident (Non-conflicting) | Raise Cost |
| Traffic Incident (Conflicting) | Prioritize Specific Traffic Information |
| Traffic Flow for Both | Use As Is for Evaluation |
| Traffic Flow Info for One Route but Not Another Route | Change or Create Traffic Flow |

ROUTE CONDITION EVALUATION METHOD AND APPARATUS FOR NAVIGATION SYSTEM

FIELD OF THE INVENTION

This invention relates to a route condition evaluation method and apparatus for a navigation system, and more particularly, to a route condition evaluation method and apparatus for a navigation system that is capable of determining an optimum route to a destination by evaluating overall costs involved in candidate routes based on types of available traffic information in addition to traditional route information available from map data.

BACKGROUND OF THE INVENTION

A navigation system performs travel guidance for enabling a user to easily and quickly reach the selected destination. A typical example is a vehicle navigation system where a navigation function is provided in a vehicle. Such a navigation system detects the position of the user, and reads out map data pertaining to an area at the current position of the user from a data storage medium, for example, a CD-ROM (compact disc read-only memory), a DVD (digital versatile disc), or a hard disc. Alternatively, such map data can be provided to the navigation system from a remote server through a communication network such as Internet.

Typically, the navigation system displays a map image on a monitor screen while superposing a mark representing the current location of the user on the map image. When a destination is set, the navigation system determines a route to the destination and starts a route guidance function to guide the user to the destination. To determine the route to the destination, the navigation system calculates and determines an optimum route to the destination based on various parameters.

An example of operation of the navigation system is described with reference to display examples of FIGS. 1A-1H. FIG. 1A shows an example of map screen when the destination is not specified. Typically, the navigation system displays a map image on which the vehicle (vehicle position VP) is running and a name of the street. When selecting a "Destination" menu on a main menu screen (not shown), the navigation system displays an "Find Destination By" screen as shown in FIG. 1B for specifying an input method for selecting the destination. The screen lists various methods for selecting the destination.

When selecting, for example, a "Point of Interest" method in FIG. 1B, the navigation system displays selection methods of point of interest (POI) either by "Place Name" or "Place Type" in FIG. 1C. If the "Place Type" is selected in FIG. 1C, the navigation system shows an "Select Category" screen such as shown in FIG. 1D. When the user selects a specific category "Restaurant", the navigation system retrieves POIs in the selected category as shown in FIG. 1E.

If the user selects a particular restaurant from the list, the navigation system displays a "Confirm Route" screen as shown in FIG. 1F. In this example, the "Confirm Route" screen lists the name, address and phone number of the destination (POI specified by the user). If this is the correct destination, the user enters an "OK to Proceed" key to proceed to the next procedure.

In FIG. 1G, the navigation system calculates and determines a route to the destination. The navigation system determines a route to the destination based on, for example, the shortest way to reach the destination, the route using many free ways as possible or the route without using toll road, and the like. After determining the calculated route, the navigation system starts the route guidance operation as shown in FIG. 1H to guide the user along the calculated route to the destination.

The navigation system will determine an optimum route by calculating the route that is regarded as the most efficient in terms of cost such as a distance, time, type of road, fee, etc. In a case where a distance for a particular route is long, the cost associated with the route is deemed high. Even a distance is short, if it takes a long time to pass through a particular route, the cost associated with the route is deemed high. If a particular route includes a toll road, the cost associated with the route is deemed high.

Some recent navigation systems are equipped with a function that can receive traffic information such as traffic incidents and conditions of roads. When the existence of a traffic incident is indicated in a particular road, the cost for the road is high. As a result, the road having the traffic incident becomes less likely to be chosen as a desired route to the destination. However, when there are conflicting information for such a road, how to weigh the cost in calculating the route is problematic.

Such a situation is explained with reference to the schematic view of FIG. 2 showing a map image reflecting traffic incident information thereon. In this example, possible routes include a route taking Freeway 5. A traffic incident icon 61 indicates that there is a traffic incident on Freeway 5. In FIG. 2, assuming also that the traffic flow information indicates reasonably free flows of traffic, for example, 50 miles per hour. Thus, there is a conflict as to which information represent the actual road condition and how to weigh the information for calculating the cost.

Moreover, there is also a case where one route contains traffic information whereas an alternative route does not contain traffic information. An example of such a situation is shown in FIG. 3 in which possible routes include Freeway 8 and Freeway 52. Freeway 8 has the traffic flow information (20 miles/hour) whereas Freeway 52 does not. The traffic speed on Freeway 52 is therefore unknown, and thus, how the cost associated with the route involving Freeway 52 and Freeway 8 is to be evaluated is problematic in finding an optimum route. Accordingly, there is a need of a method to evaluate the reliability and accuracy of the traffic information to obtain an optimum route to the destination.

SUMMARY OF THE INVENTION

It is, therefore, an object of the present invention to provide a method and apparatus for a navigation system which is capable of evaluating a route condition for determining an optimum route to the destination.

The method and apparatus evaluates an overall cost of each candidate route by incorporating traffic information such as traffic incident types and traffic flow speeds. An optimum route to the destination is determined by comparing the costs of two or more candidate routes and selecting a candidate route of the least cost. The method and apparatus determines relevancy and accuracy of the traffic information and adjusting the cost of the candidate route. When the traffic information on the candidate route shows a conflicting situation, the method and apparatus modifies the cost derived from the traffic information. When modifying the cost, the traffic speed information is prioritized over other type of traffic information.

One aspect of the present invention is a route condition evaluation method for a navigation system. The method includes the steps of: creating candidate routes to a destination specified by a user based on a cost of each candidate route derived from map data; receiving traffic information from a traffic information server; identifying the traffic information associated with the candidate routes; and evaluating an overall cost of each candidate route incorporating a cost derived from the traffic information on the candidate route to determine an optimum route to the destination. The cost derived from the traffic information will be modified when the traffic information on the candidate route shows a conflicting situation.

The route condition evaluation method compares the costs of two or more candidate routes and selecting a candidate route of the least cost as the optimum route to the destination. When the conflicting situation is caused by the traffic information which includes traffic incident type information and traffic speed information for the same candidate route, the traffic speed information is prioritized for obtaining the cost derived from the traffic information.

When the conflicting situation is caused because one candidate route shows traffic speed information while another candidate route lacks traffic speed information, a traffic speed for the another candidate route is created by decreasing a maximum allowable speed of the another candidate route by a predetermined ratio, thereby increasing the cost. Alternatively, when the conflicting situation is caused because one candidate route shows traffic speed information while another candidate route lacks traffic speed information, a traffic speed for the one candidate route is increased by a predetermined ratio, thereby decreasing the cost.

Another aspect of the present invention is an apparatus for evaluating a route condition of each candidate route by incorporating traffic information such as traffic incident types and traffic flow speeds. The apparatus determines an optimum route to the destination by comparing the costs of two or more candidate routes and selecting a candidate route of the least cost. The apparatus determines relevancy and accuracy of the traffic information and adjusting the cost of the candidate route. When the traffic information on the candidate route shows a conflicting situation, the apparatus modifies the cost derived from the traffic information.

According to the present invention, the route condition evaluation method and apparatus incorporates a cost associated with the traffic information in addition to the traditional cost associated with the map data. An optimum route to the destination is determined by comparing the costs of two or more candidate routes and selecting a candidate route of the least cost. The method and apparatus is able to adjust the cost of a candidate route based on the relevancy and reliability of the traffic information. Since the relevancy and reliability of the traffic information are taken into account, it is possible to determine an optimum route to a destination more accurately.

BRIEF DESCRIPTION OF THE DRAWINGS

FIGS. 1A-1H show a typical example of overall procedure and screen display involved in the navigation system to select a destination, to determine a route to the destination, and to guide the user to the destination.

FIG. 10 is a table showing the possible conflicting situations and the cost adjustment in the present invention to improve the accuracy and reliability in evaluating the route condition to calculate an optimum route to the destination.

DETAILED DESCRIPTION OF THE INVENTION

The present invention will be described in detail with reference to the accompanying drawings. The route condition evaluation method and apparatus for a navigation system in the present invention is able to adjust the cost associated with candidate routes to the destination. Especially, the route condition evaluation method and apparatus weighs and prioritizes the traffic information when there is conflicting information or lack of certain information on road conditions to improve accuracy of selecting an optimum route.

In determining an optimum route to the destination, the route search method and apparatus evaluates the traffic information in addition to the traditional route information obtained from the map data. Some of the recent navigation systems are equipped with an apparatus that can receive traffic information such as traffic incidents and road conditions. The traffic incidents include a traffic accident, stalled vehicle, police inspection, fire, and the like. The road conditions include lane closure, construction, gravel on the surface, and the like. For simplicity of explanation, hereafter, the road conditions will also be referred to as traffic incidents.

The present invention evaluates the traffic information to determine the optimum route to the destination. In particular, the present invention provides a method for prioritizing or changing the traffic information when a type of traffic information conflicts with one another for a candidate route. Further, the present invention provides a method for changing or creating the traffic information when a type of traffic information is not available for a candidate route while such traffic information is available for another candidate route.

Figure 2:
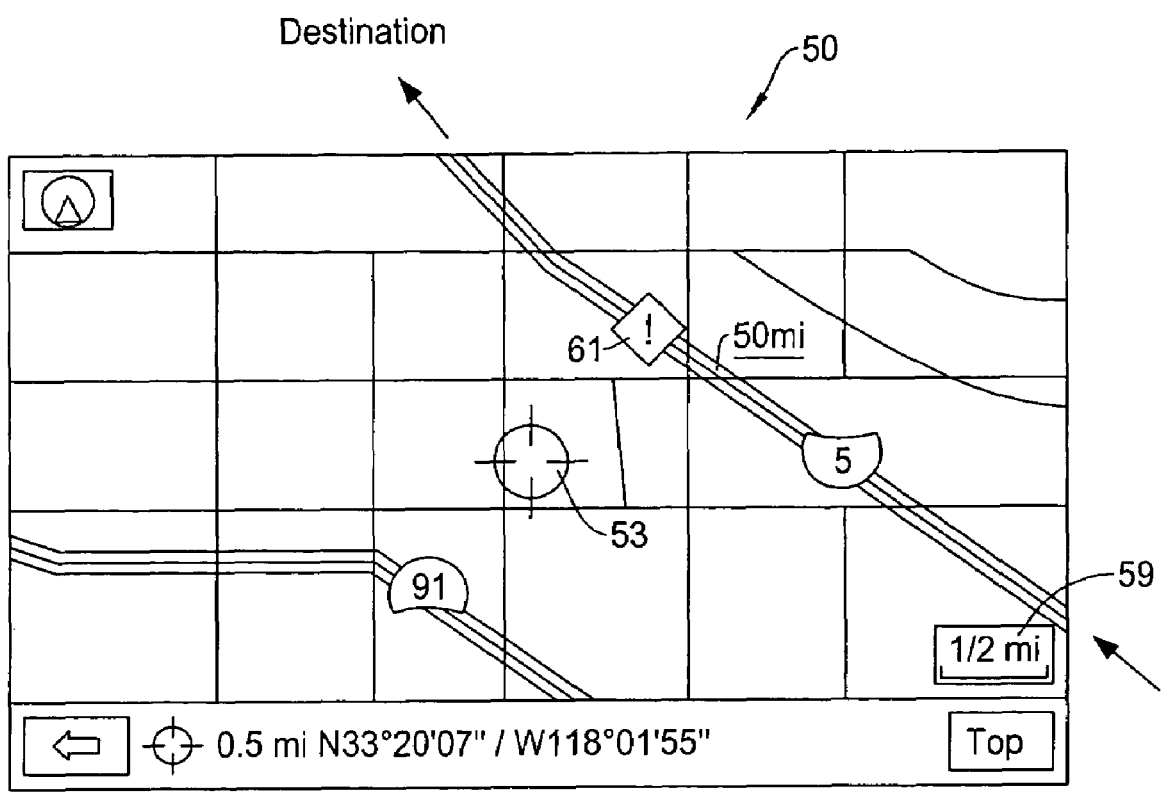
FIG. 2 is a schematic plan view showing a map image and traffic information for describing a conflicting situation in determining an optimum route to the destination by the navigation system.
Figure 4:
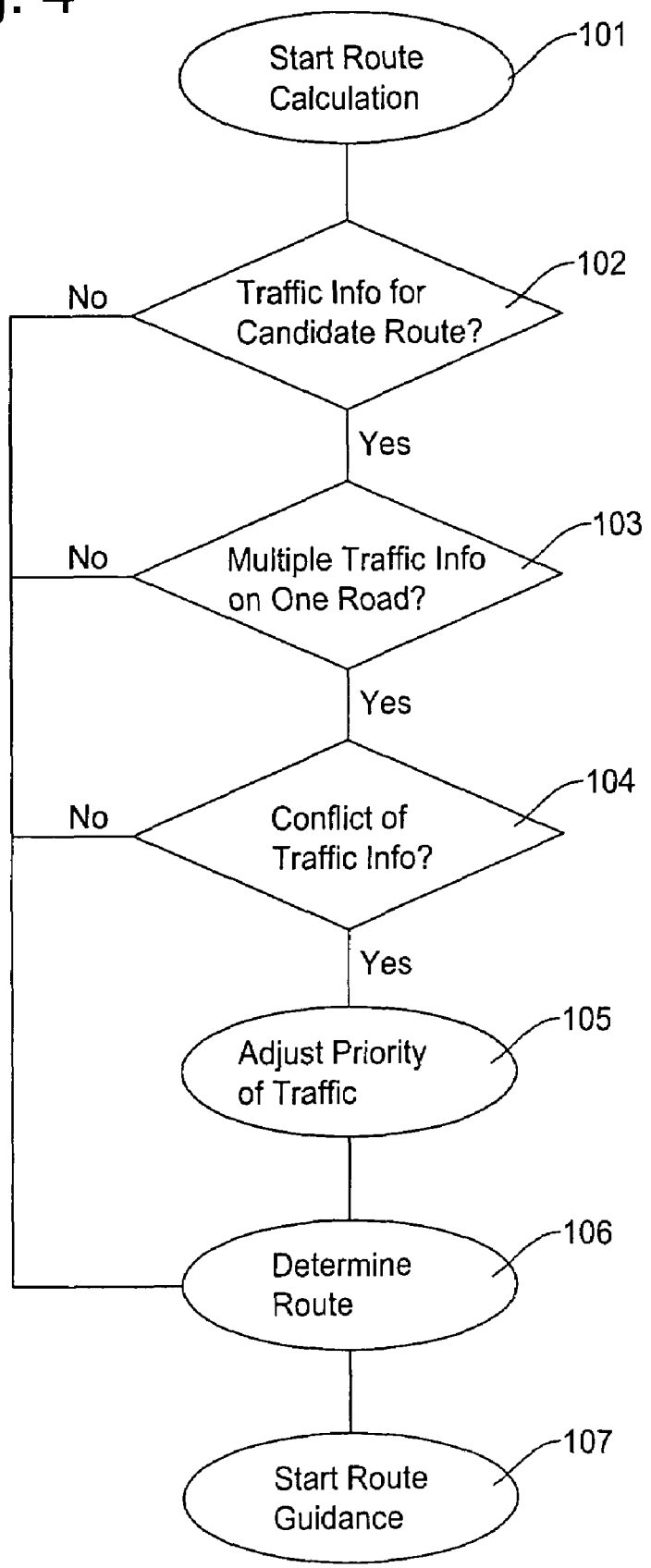
FIG. 4 is a flow chart showing the steps of evaluating the route condition to calculate an optimum route to the destination in the present invention for the road situation presented with reference to FIG. 5.
Figure 5:
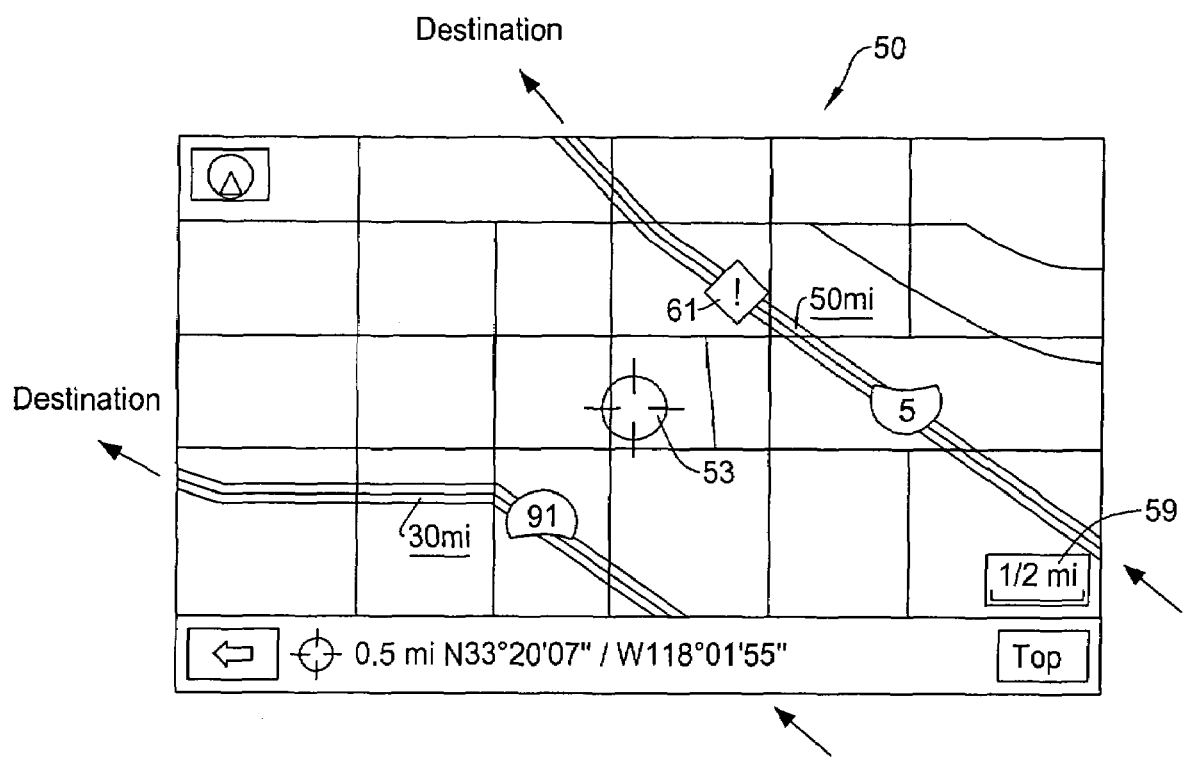
FIG. 5 is a schematic view showing the road situation similar to that shown in FIG. 2 for evaluating the costs of possible routes to determine an optimum route to the destination by the present invention.

FIG. 4 is a flow chart showing an example of basic operational steps for calculating an optimum route to the destination in the present invention in the road situation of FIG. 5. In this example, FIG. 5 shows an example of road situation including the map image and the traffic information that may be displayed on the screen of the navigation system. This road situation is similar to that shown in FIG. 2 in which the contents of the traffic information on the road segment on the candidate route to the destination conflict with one another. In such a situation, the route condition evaluation method and apparatus of the present invention evaluates the information and determines the overall costs of the candidate routes to obtain an optimum route to the destination.

In FIG. 4, at the step 101, the navigation system starts route calculation to find possible routes to the destination with use of the traditional route information retrieved from the map data. As noted above, the navigation system determines candidate routes to the destination based on, for example, the shortest way to reach the destination, the route using many free ways as possible or the route without using toll road, and the like, i.e, various factors (distance, time, fee, type of road, etc.) that determine the overall cost. In the present invention, the navigation system will evaluate the cost based not only on the information obtained from the map data but also from the traffic information.

Thus, in the step 102, the navigation system checks if there is traffic information regarding road segments on a candidate route to the destination. In the road condition of FIG. 5, the monitor 50 of the navigation system shows a map image which includes two or more possible routes to the destination. A cursor 53 and a map scale 59 are also shown on the screen 50. Although not shown, this example assumes the situation where the destination is at the outside of the screen 50 at the top and left as indicated by arrows. The destination can be reached by two candidate routes, one having Freeway 91 and another having Freeway 5, as displayed on the monitor screen 50.

A traffic incident icon 61 is indicated on Freeway 5 which shows that there is a traffic incident. The traffic incident information includes such information as traffic accident, stalled vehicle, fire, road construction, lane closure, surface condition, etc. Moreover, Freeway 5 has traffic flow information, which is the speed of traffic flow at a particular location on the road. In this example, Freeway 91 also has traffic flow information. As noted above, the traffic information may be obtained from a service provider through various means, for example, through satellite radio, FM radio, or wireless or wired internet connection, etc. The traffic flow information can be obtained from the same or different service provider.

Since there are traffic information on the candidate routes, the process moves to the step 103 of FIG. 4 in which the navigation system checks whether two or more types of traffic information exist on the same road segment. In the situation shown in FIG. 5, the road segment for Freeway 5 has traffic incident 61 as well as the traffic speed of 50 miles per hour. Thus, the process moves to the step 104 to determine whether such a multiple of traffic information conflict with one another.

In the example of FIG. 5, with respect to Freeway 5, a problem arises in that the navigation system wants to avoid this road because of the traffic incident such as a traffic accident indicated by the traffic incident icon 61 as it is considered to be congested. However, the traffic speed of 50 mile/hour indicated on Freeway 5 is a reasonably good flow. Thus, there is a conflict of information as to evaluating the desirability of choosing Freeway 5 for the route to the destination. Further, in FIG. 5, the traffic speed of Freeway 91 is 30 mile/hour which is slow although there is no traffic incident is reported. Therefore, in both cases, there are conflicts of information for evaluating the overall cost for the candidate routes.

Thus, the process moves to the step 105 to determine which information should be used to evaluate the cost. In the example of FIG. 5 in which the traffic information includes a traffic speed, which seems to be contradicting the other traffic information, the method of the present invention will prioritize the traffic speed information. Therefore, with respect to Freeway 5 in the example of FIG. 5, the traffic speed of 50 mile/hour is used to determine the current driving condition on Freeway 91. With respect to Freeway 91, because no other traffic information is shown and also because the traffic speed information should be prioritized, the traffic speed of 30 mile/hour is used to determine the current driving condition.

In the above example, the reason that the traffic flow information (traffic speed) has a higher priority is that because the information regarding the traffic speed is usually more reliable since it is expressed by a numerical value. Even if a traffic accident exists, there may be a situation in that the traffic flow is not significantly affected by the accident. Moreover, traffic accident information may be updated less frequently compared to the traffic flow (speed) information which can be relatively easily and accurately measured. Thus, in this case, the navigation system will prioritize the traffic flow information over other information.

Based on the current driving conditions determined in the step 105, the method of the present invention determines an optimum route in the step 106. As far as the comparison between Freeway 5 and Freeway 91 is concerned, Freeway 5 may be preferred in terms of the cost associated with the traffic speed as mentioned above. The navigation system evaluates the overall cost (including the traditional cost of distance, fee, etc.) and determines the optimum route to the destination. Then in the step 107, the navigation system starts the route guidance operation to guide the user to the destination through the optimum route.

The navigation system may dynamically change priority of the traffic information based on data accumulated in the past. For example, the navigation system may store traffic information regarding the actual flow of the traffic of a particular road segment in the past. In the case where the accuracy of the traffic flow information has been relatively low from the past experience, the priority of the traffic flow information is decreased to reflect the past performance of the traffic flow information.

The navigation system may also adjust the priority of the traffic information by storing data for a particular road segment based on the time of day. For example, the navigation system may determine that traffic incident information is more accurate at commuter time than that of daytime or midnight. Thus, in the case of commuter time, the navigation system will increase the priority of the traffic incident information to calculate the route.

Figure 6:
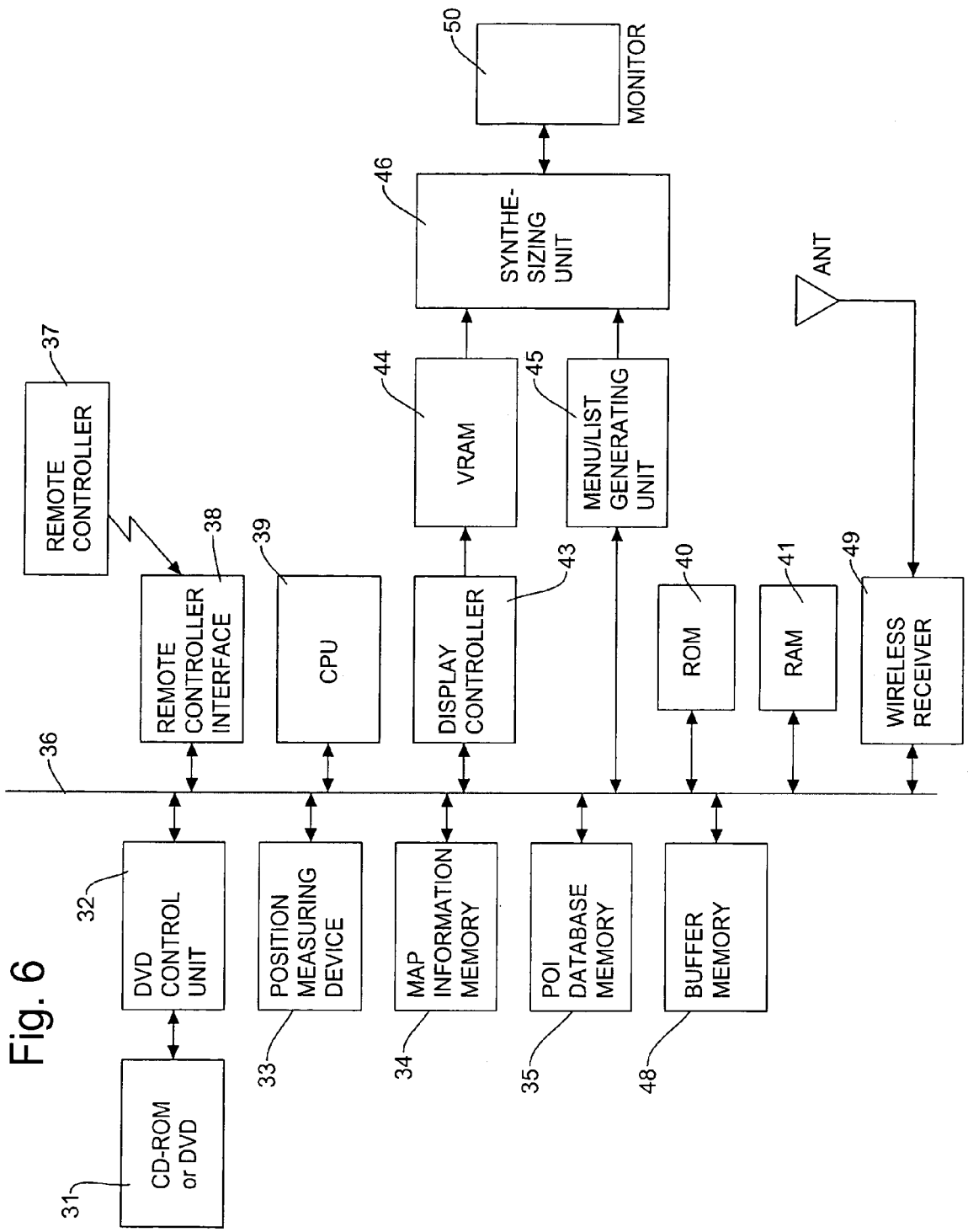
FIG. 6 is a block diagram showing an example of structure in a vehicle navigation system for implementing the present invention.

FIG. 6 shows an example of structure of a vehicle navigation system implementing the route condition evaluation method of the present invention. It should be noted that the present invention can also be applied to portable navigation devices such as a PDA (personal digital assistant) device, a lap-top computer, or other hand-held devices.

In the block diagram of FIG. 6, the navigation system includes a map storage medium 31 such as a CD-ROM, DVD, hard disc or other storage means (hereafter "DVD") for storing map information, a DVD control unit 32 for controlling an operation for reading the map information from the DVD 31, a position measuring device 33 for measuring the present vehicle position. The position measuring device 33 has a vehicle speed sensor for detecting a moving distance, a gyroscope for detecting a moving direction, a microprocessor for calculating a position, a GPS receiver, and etc.

The block diagram of FIG. 6 further includes a map information (data) memory 34 for storing the map information retrieved from the DVD 31, a database memory 35 for storing database information such as point of interest (POI) information which is read out from the DVD 31, a remote controller 37 for executing a menu selection operation, an enlarge/reduce operation, a destination input operation, etc. and a remote controller interface 38.

Figure 7:
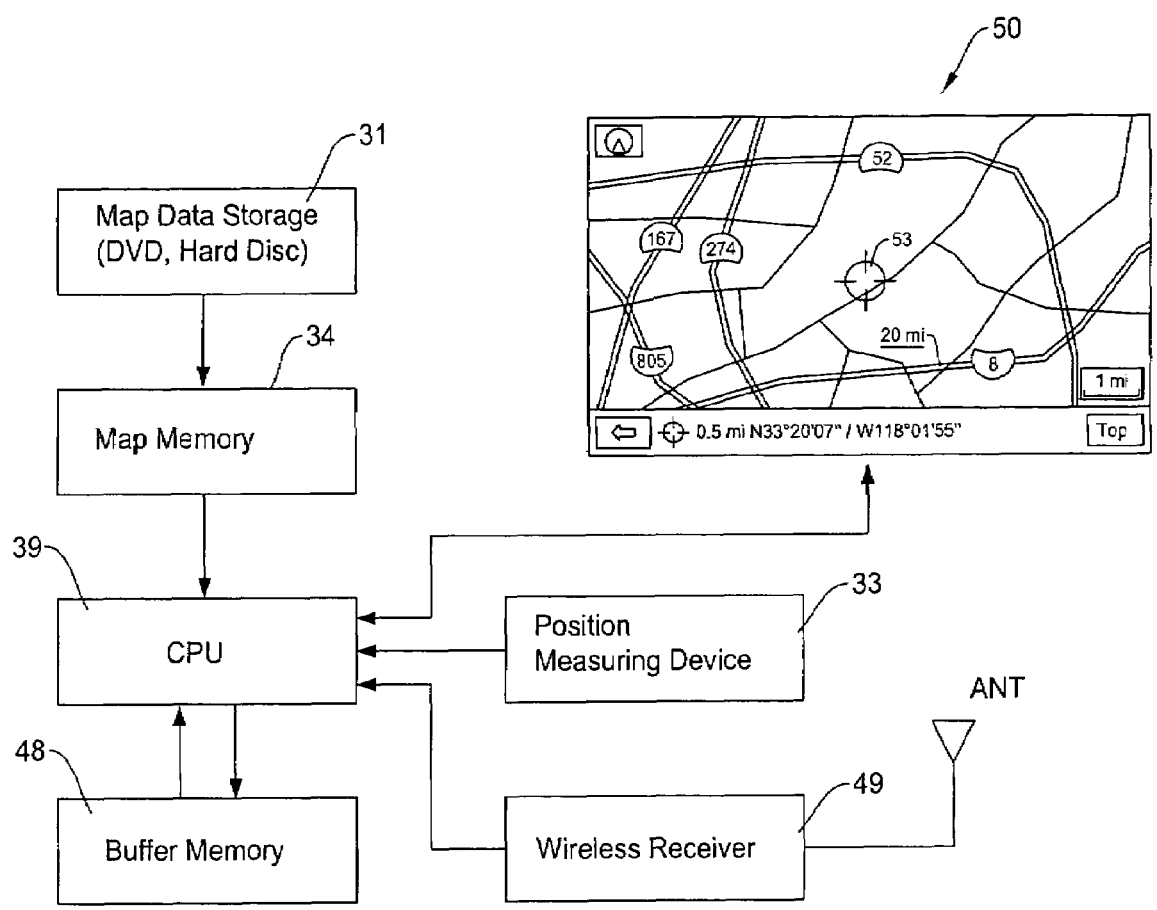
FIG. 7 is a block diagram showing an example of structure of a route evaluation apparatus for determining an optimum route to the destination in accordance with the present invention.

The navigation system further includes a bus 36 for interfacing the above units in the system, a processor (CPU) 39 for controlling an overall operation of the navigation system including the route condition evaluation method of the present invention by evaluating the costs of candidate routes, a ROM 40 for storing various control programs such as a route search program and a map matching program necessary for navigation control, a RAM 41 for storing a processing result such as a guide route, a display controller 43 for generating a map image (a map guide image and an arrow guide image) on the basis of the map information, a VRAM (Video RAM) 44 for storing images generated by the display controller, a menu/list generating unit 45 for generating menu image/various list images, a synthesizing unit 46, a buffer memory 48, a wireless receiver 49, and a monitor (display) 50. The wireless receiver 49 is used to receive traffic information such as traffic accident, road construction, traffic speed, etc. as noted above FIG. 7 is a functional block diagram showing an example of basic structure of the apparatus of the present invention for conducting the route evaluation and determining an optimum route to the destination. The structure of FIG. 7 is illustrated by the components corresponding to that shown in the block diagram of FIG. 6 but not limited to vehicle navigation system. The components of the apparatus includes a monitor 50 for interfacing with the user and displaying the candidate routes and associated traffic information, and a CPU 39 for controlling an overall operation of the route condition evaluation method of the present invention.

The block diagram of FIG. 7 further includes a map data storage 31 such as a DVD or a hard disc for storing the map data, a map memory 34 for storing map data associated with a particular location retrieved from the map data storage 31, a position measuring device 33 for detecting a current position of the user, a buffer memory 48 for temporarily storing various types of data such as traffic information for data processing, and a wireless (or wired) receiver 49 for receiving the traffic information from a remote traffic information server. The buffer memory 48 can be implemented by RAM 41 in FIG. 6 or other memory.

At the start of the operation, the user specifies a destination through the process such as shown in FIGS. 1B-1F. As shown in FIG. 7, the CPU 39 is able to retrieve the map data from the map memory 34 and map data storage 31 for an area associated with an operation for finding an optimum route to the destination. The information showing the current position of the user is also given to the CPU 39 from the position measuring device 33. Thus, two or more candidate routes to the destination can be detected through the route calculation process such as shown in FIG. 1G. In the present invention, during this route calculation process, the CPU 39 also evaluates the traffic information received through the receiver 49.

Thus, in addition to the costs based on the traditional route information derived from the map data such as a distance, time, type of road, fee, the CPU 39 also evaluates the cost derived from the traffic information as described with reference to FIGS. 4 and 5. During the cost evaluation, the CPU 39 changes the weight of the traffic information. For example, as noted with reference to FIGS. 4 and 5, the CPU 39 treats the information regarding actual speed of the traffic more reliable than the traffic incident type information on the same road segment. In another example, the CPU 39 changes the value of the traffic speed or creates the traffic speed in such a situation as will be described with reference to FIGS. 8 and 9.

As a result of the overall cost evaluation for the candidate routes to the destination, the CPU 39 determines an optimum (lowest cost) route. During the evaluation, the information related to the evaluation may be temporarily stored in the buffer memory 48 for easy access. Also the information obtained during this process may be stored in the navigation system to be used in the future for the similar situation. Then, the navigation system starts the route guidance operation as shown in FIG. 1H to guide the user to the destination through the optimum route determined in the foregoing process.

Figure 3:
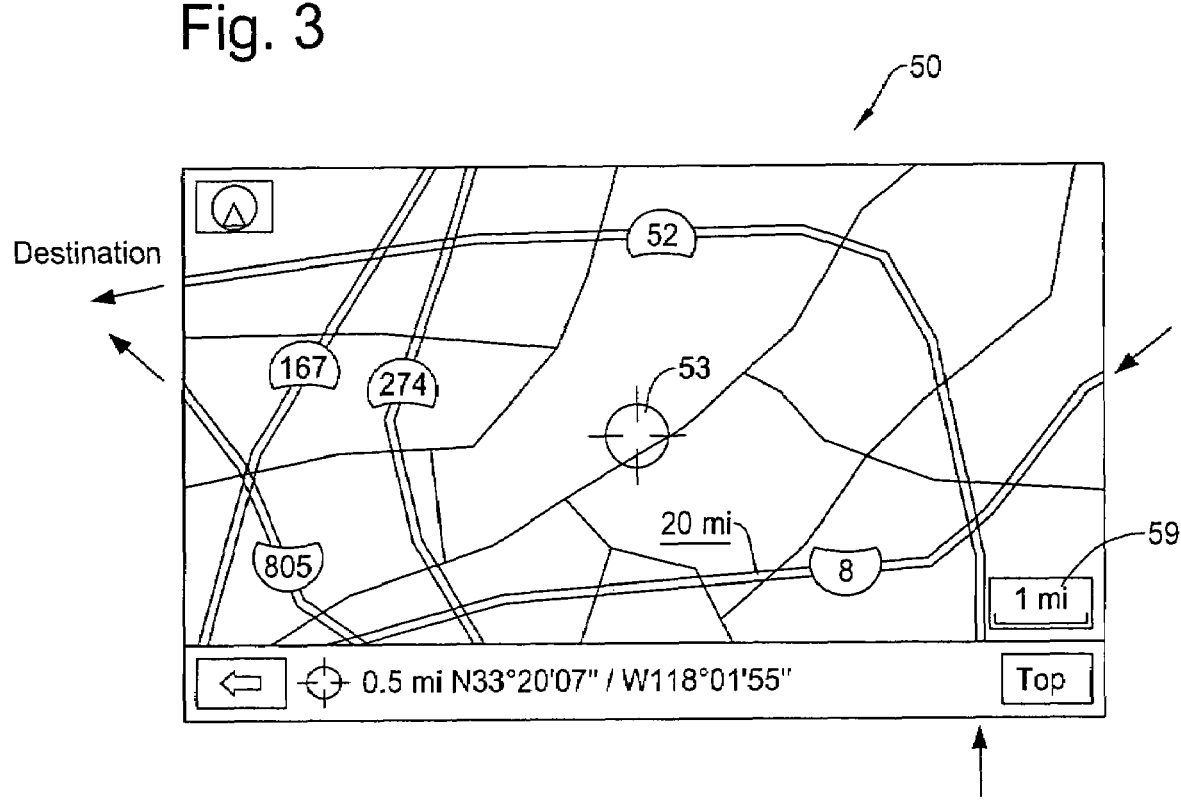
FIG. 3 is another schematic plan view showing a map image and traffic information for describing another conflicting situation in determining an optimum route to the destination by the navigation system.
Figure 8:
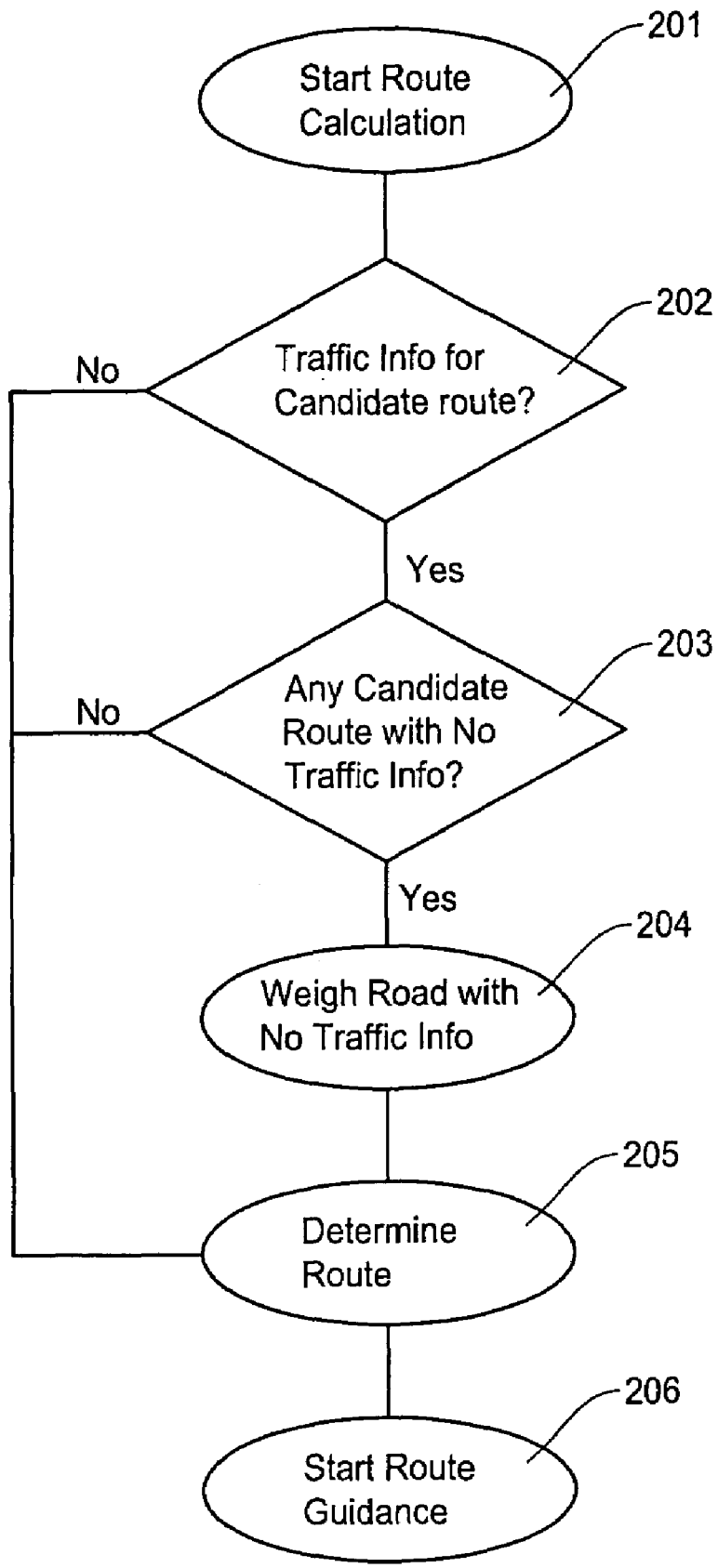
FIG. 8 is a flow chart showing the steps of evaluating the route condition to calculate an optimum route to the destination in the present invention for the road situation presented with reference to FIG. 9.
Figure 9:
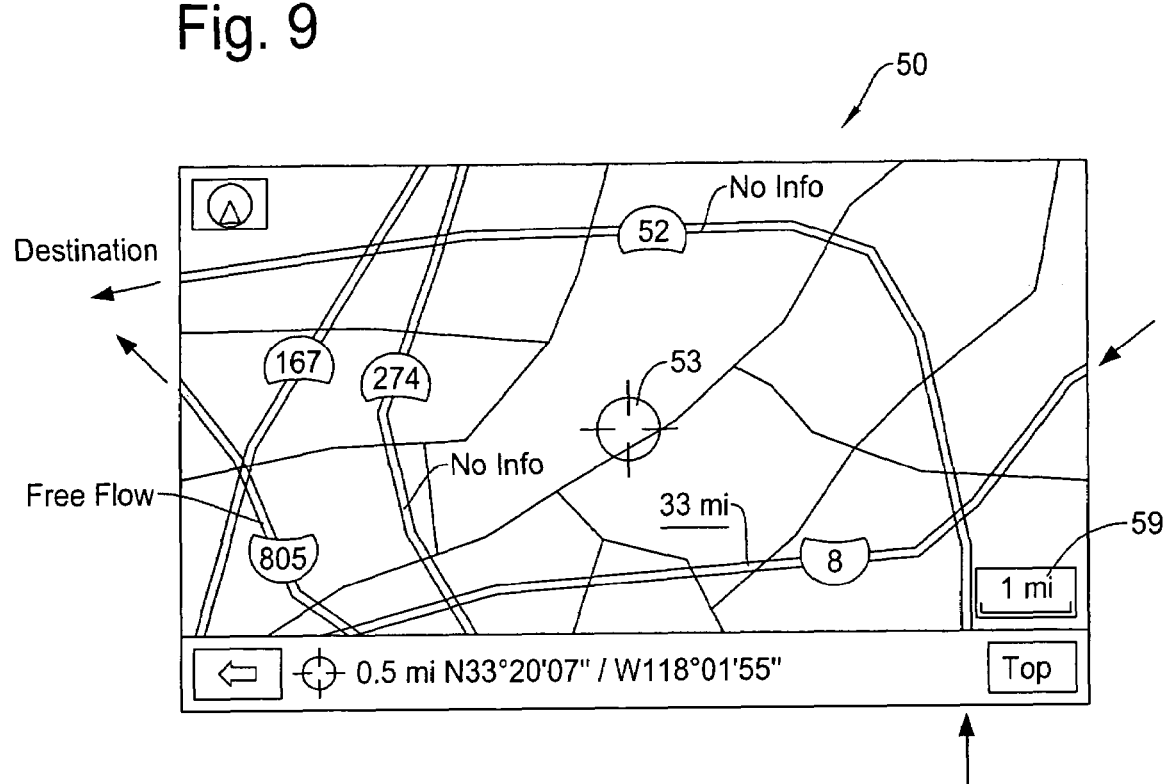
FIG. 9 is a schematic view showing the road situation similar to that shown in FIG. 3 for evaluating the costs of possible routes to determine an optimum route to the destination by the present invention.

Another example of a situation that can pose difficulty in assuming the traffic condition based on traffic information is described with reference to FIGS. 8 and 9. This example is in a situation similar to that shown in FIG. 3. FIG. 8 is a flow chart showing an example of operational steps of evaluating the route condition in the present invention for the case of FIG. 9. FIG. 9 is a display example on the navigation system showing the map image having candidate routes and the traffic information. The road situation of FIG. 9 includes a conflicting situation in determining an optimum route to the destination by the navigation system.

In this example, one candidate route to the destination includes Freeway 8 and Freeway 805, and another candidate route includes Freeway 52. This example assumes the situation where the destination is at the outside of the screen at the left as indicated by the arrows. As shown in FIG. 9, Freeway 8 and Freeway 805 have traffic flow information whereas Freeway 52 does not. The speed on Freeway 52 is therefore unknown, and how the cost associated with the road segment of Freeway 52 and Freeway 8 is to be evaluated is problematic in finding an optimum route. There is no guarantee that the road segment that lacks traffic flow information has a free flow of traffic. In a worst case scenario, the road segment that lacks traffic flow information has much heavier traffic than the road segment that indicates a slow traffic flow.

The process of adjusting the costs of the road segments in considering the problems above is described with reference to the flow chart of FIG. 8. In the step 201, the navigation system starts route calculation to detect candidate routes to the destination with use of the information obtained from the map database. As noted above, the navigation system determines a route to the destination based on various factors (distance, time, fee, road type, etc.) that affect the overall cost. In the present invention, the navigation system will evaluate the cost based not only on the map information but also on the traffic information obtained from the traffic information server through the wireless or wired communication.

Thus, in the step 202, the navigation system communicates with the traffic information service provider to check if there is any traffic information regarding a road segment on a candidate route to the destination. In the example of FIG. 9, the traffic flow information is given to Freeway 8 and Freeway 805 which configure one of the candidate routes. Therefore, the navigation system moves to the step 203 to determine whether there is any candidate route that has no traffic information. As noted above, no traffic information is provided to Freeway 52, thus, the process moves to the step 204 to adjust the cost of the candidate route.

In adjusting the cost of the road segment, several methods may be used. One example is to reduce the traffic speed of the road segment without traffic information by a predetermined ratio such as a half of the maximum allowable speed. For example, if the maximum allowable speed of Freeway 52 is 60 mile/hour, the navigation system estimates the current traffic flow of 30 mile/hour since there is no traffic information available for Freeway 52. This in effect increases the cost of the road segment, i.e., the navigation system assumes that Freeway 52 is currently congested.

Alternatively, similar effect can be obtained by reducing the cost of the road segment in another candidate route that has traffic information. The road segment with traffic information becomes more preferable by, for example, increasing the traveling speed by a predetermined ratio such as 20%, thereby reducing the cost associated with the road segment. For example, with respect to Freeway 8, the navigation system may increase the traffic speed of 33 mile/hour to 40 mile/hour.

Based on the current driving conditions determined in the step 204, the navigation system of the present invention determines the optimum route in the step 205 by comparing the costs of the candidate routes. As far as the comparison between Freeway 52 (30 mile/hour) and Freeway 8 (40 mile/hour) is concerned, Freeway 8 may be preferred in terms of the cost associated with the traffic speed. The navigation system evaluates the overall cost and determines an optimum route to the destination. Then in the step 206, the navigation system starts the route guidance operation to guide the user through the optimum route.

As noted above, the navigation system may dynamically change the priority of the traffic information based on data accumulated in the past to improve accuracy of route calculation. For example, the navigation system may record an actual speed of the vehicle while driving a particular road segment that does not have traffic information, and use the record in the next occasion involving the same road segment to adjust the cost. Moreover, the navigation system may correlate the vehicle speed at a road segment that does not have traffic information to time of a day. This allows the navigation system to take into account the traffic flows in commuting times (rush hours) or other times.

In the above-described situations and steps may be combined to accommodate a more complex situation. For instance, assuming that there is a road segment with conflicting traffic information such as described with reference to FIG. 5, a road segment having a non conflicting information, and a road segment that does not have traffic information such as shown in FIG. 9. The problem can be solved by combining the steps described above with reference to FIGS. 4 and 8.

As the navigation system starts route calculation, it will determine if road segments exist in the candidate route to the destination have traffic information or no traffic information. For each road segment, the navigation system evaluates the traffic information, for example, whether the information is conflicting. If there is no traffic information on the road, the navigation system assumes the current driving speed on the road segment by creating the traffic speed. The navigation system adjusts the traffic information and compares the overall costs of the candidate routes to determine an optimum route.

FIG. 10 shows a simple table that includes possible conditions of candidate routes and the corresponding cost adjustment. If no traffic information is available for a candidate route, the navigation system evaluates the cost based solely on the traditional route information obtained from the map data. When traffic information is detected for a candidate route and a traffic incident such as a traffic accident indicated by the information is not conflicting with other type of information, the navigation system increases the cost by reflecting the traffic incident. When the traffic incident is conflicting with a specific information type such as a traffic flow, the navigation system prioritize the traffic flow as noted with reference to FIGS. 4 and 5. Since the route condition evaluation method prioritizes the traffic flow over other information, if the traffic flow data is detected for two or more candidate routes, the navigation system incorporates the traffic flow data, as is, to increase or decrease the costs. In the case where a traffic flow is available for one candidate route while a traffic flow is not available for another candidate route, the navigation system changes or creates the value of the traffic flow as noted with reference to FIGS. 8 and 9.

In the traffic information described above, only the traffic incident information and traffic flow information were described. However, the method of adjusting the cost based on the traffic information may be used for other traffic information for candidate route. For example, the traffic information may include road condition such as slippery surface condition because of rain, etc.

As has been described above, the method and apparatus of the navigation system under the present invention incorporates a cost associated with the traffic information in addition to the traditional cost associated with the map data. An optimum route to the destination is determined by comparing the costs of two or more candidate routes and selecting a candidate route of the least cost. The method and apparatus is able to adjust the cost of a candidate route based on the relevancy and reliability of the traffic information. Since the relevancy and reliability of the traffic information are taken into account, it is possible to determine an optimum route to a destination more accurately.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A route condition evaluation method for a navigation system, comprising the following steps of:
 creating candidate routes to a destination specified by a user based on a cost of each candidate route derived from map data;
 receiving traffic information from a traffic information server;
 identifying the traffic information associated with the candidate routes; and
 evaluating an overall cost of each candidate route incorporating a cost derived from the traffic information on the candidate route to determine an optimum route to the destination;
 wherein said cost derived from the traffic information will be modified when the traffic information on the candidate route shows a conflicting situation; and
 wherein said step of evaluating the overall cost includes a step of increasing the cost of a candidate route when the traffic information shows a traffic incident on the candidate route that causes a slow traffic speed on the candidate route, and said traffic incident includes a traffic accident, stalled vehicle, police inspection, fire, lane closure, and construction.

2. A route condition evaluation method for a navigation system as defined claim 1, further comprising a step of comparing the costs of two or more candidate routes and selecting a candidate route of least cost as the optimum route to the destination.

3. A route condition evaluation method for a navigation system as defined claim 1, wherein, when said conflicting situation is caused by the traffic information which includes traffic incident type information and traffic speed information for the same candidate route, the traffic speed information is prioritized for obtaining the cost derived from the traffic information.

4. A route condition evaluation method for a navigation system as defined claim 1, wherein, when said conflicting situation is caused because one candidate route shows traffic speed information while another candidate route lacks traffic speed information, a traffic speed for the another candidate route is created by decreasing a maximum allowable speed of the another candidate route by a predetermined ratio, thereby increasing the cost.

5. A route condition evaluation method for a navigation system as defined claim 1, wherein, when said conflicting situation is caused because one candidate route shows traffic speed information while another candidate route lacks traffic speed information, a traffic speed for the one candidate route is increased by a predetermined ratio, thereby decreasing the cost.

6. A route condition evaluation method for a navigation system as defined claim 1, wherein said cost of each candidate route derived from the map data includes a distance, time length, and fee of the route.

7. A route condition evaluation method for a navigation system as defined in claim 1, wherein said step of receiving the traffic information includes a step of displaying a traffic incident icon and traffic speed data with respect to a map image of the candidate route.

8. A route condition evaluation method for a navigation system as defined in claim 1, wherein said step of receiving the traffic information includes a step of communicating with the traffic information server through a wireless or wired communication device.

9. A route condition evaluation apparatus for a navigation system, comprising:
    means for creating candidate routes to a destination specified by a user based on a cost of each candidate route derived from map data;
    means for receiving traffic information from a traffic information server;
    means for identifying the traffic information associated with the candidate routes; and
    means for evaluating an overall cost of each candidate route incorporating a cost derived from the traffic information on the candidate route to determine an optimum route to the destination;
    wherein said cost derived from the traffic information will be modified when the traffic information on the candidate route shows a conflicting situation; and
    wherein said means for evaluating the overall cost includes means for increasing the cost of a candidate route when the traffic information shows a traffic incident on the candidate route that causes a slow traffic speed on the candidate route, and said traffic incident includes a traffic accident, stalled vehicle, police inspection, fire, lane closure, and construction.

10. A route condition evaluation apparatus for a navigation system as defined claim 9, further comprising means for comparing the costs of two or more candidate routes and selecting a candidate route of least cost as the optimum route to the destination.

11. A route condition evaluation apparatus for a navigation system as defined claim 9, wherein, when said conflicting situation is caused by the traffic information which includes traffic incident type information and traffic speed information for the same candidate route, the traffic speed information is prioritized for obtaining the cost derived from the traffic information.

12. A route condition evaluation apparatus for a navigation system as defined claim 9, wherein, when said conflicting situation is caused because one candidate route shows traffic speed information while another candidate route lacks traffic speed information, a traffic speed for the another candidate route is created by decreasing a maximum allowable speed of the another candidate route by a predetermined ratio, thereby increasing the cost.

13. A route condition evaluation apparatus for a navigation system as defined claim 9, wherein, when said conflicting situation is caused because one candidate route shows traffic speed information while another candidate route lacks traffic speed information, a traffic speed for the one candidate route is increased by a predetermined ratio, thereby decreasing the cost.

14. A route condition evaluation apparatus for a navigation system as defined claim 9, wherein said cost of each candidate route derived from the map data includes a distance, time length, and fee of the route.

15. A route condition evaluation apparatus for a navigation system as defined in claim 9, wherein said means for receiving the traffic information includes means for displaying a traffic incident icon and traffic speed data with respect to a map image of the candidate route.

16. A route condition evaluation apparatus for a navigation system as defined in claim 9, wherein said means for receiving the traffic information includes means for communicating with the traffic information server through a wireless or wired communication device.

* * * * *